No. 626,211. Patented May 30, 1899.
H. KINTZ.
CAR TRUCK.
(Application filed Mar. 14, 1899.)
(No Model.)
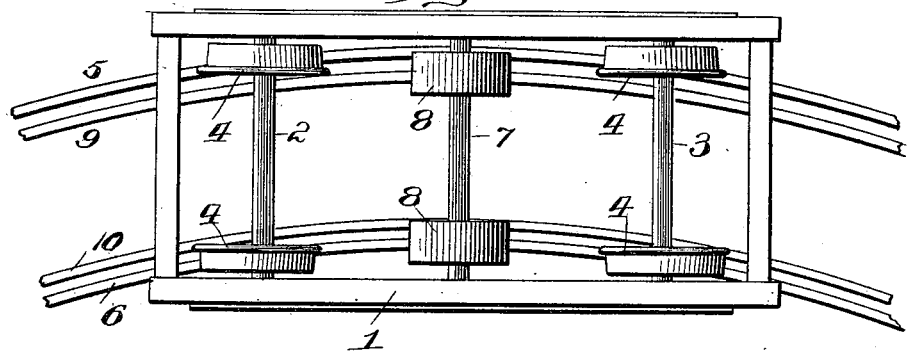
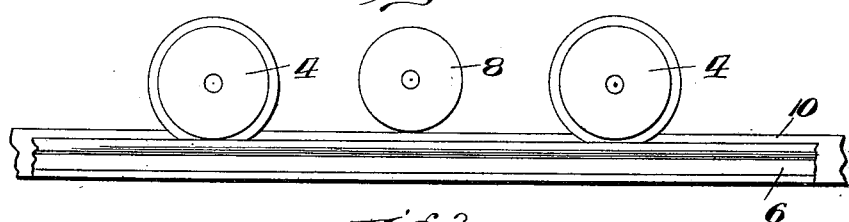
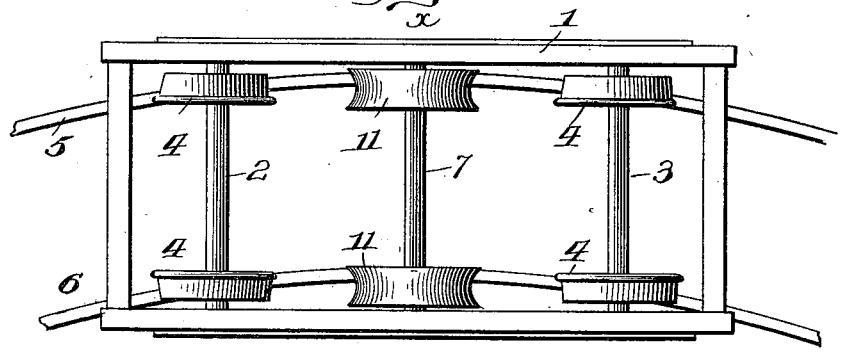
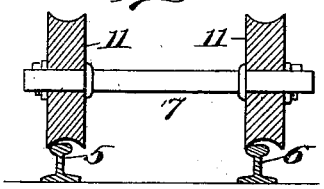
Witnesses:
J. M. Fowler Jr.
E. Griffith
Inventor:
Herbert Kintz,
by Edwin Cruise,
Attorney.
THE NORRIS PETERS CO., PHOTO-LITHO., WASHINGTON, D. C.

UNITED STATES PATENT OFFICE.

HERBERT KINTZ, OF SHARPSBURG, PENNSYLVANIA, ASSIGNOR OF ONE-HALF TO JACOB MILBERT, OF SAME PLACE.

CAR-TRUCK.

SPECIFICATION forming part of Letters Patent No. 626,211, dated May 30, 1899.

Application filed March 14, 1899. Serial No. 709,085. (No model.)

*To all whom it may concern:*

Be it known that I, HERBERT KINTZ, a citizen of the United States, residing at Sharpsburg, in the county of Allegheny and State of Pennsylvania, have invented certain new and useful Improvements in Car-Trucks; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to railway-car trucks, its object being to relieve the friction between the front and rear supporting-wheels of the truck and the track-rails when the truck is moving over a curve. With this object in view I propose to provide such trucks with supplemental wheels intermediate their front and rear supporting-wheels and substantially midway the length of the truck, which supplemental wheels will, when the truck is moving over a curved track, relieve the front and rear supporting-wheels from the major portion of the weight sustained by them when running on a straight track, and the truck will thus be enabled to turn on said supplemental wheels as on a pivot to adjust itself to the proper position to travel on the curve with a minimum of friction between the front and rear wheels and the track-rails.

The invention will be fully described in the following specification and its novel features defined in the claims.

In the accompanying drawings, Figure 1 is a plan view of a car-truck frame, showing the supplemental wheels adapted to run on supplemental rails at a curve in the track. Fig. 2 is a side elevation of the wheels and rails, the truck-frame being omitted. Fig. 3 is a plan view of a car-truck, showing the supplemental wheels adapted to run on the ordinary track-rails whether straight or curved. Fig. 4 is a sectional view on the line $xx$ of Fig. 3, showing the position of the supplemental wheels on the rails when the latter are curved.

Similar reference-numerals indicate like parts on the several figures.

The truck-frame is indicated by 1, and the front and rear axles by 2 and 3, respectively. Each of these axles carries a pair of flanged wheels 4, which are fast on the axle and turn with it and are adapted to run on the track-rails 5 and 6. These parts may be of any ordinary or well-known construction.

7 indicates a supplemental axle mounted on the truck-frame intermediate the front and rear axles and substantially midway the length of the truck. This axle will preferably be so connected to the truck as to have no rotary movement; but it may be journaled in boxes similar to the other axles.

Referring now to Figs. 1 and 2, it will be seen that a pair of wheels 8 are mounted on the axle 7 and have flat peripheries and no flanges. The wheels 8 will turn freely on their axle, are of less diameter than the wheels 4, and when the truck is running over a substantially straight track they are not intended to be in contact with any rail. Where, however, there is a sharp curve in the track, I propose to provide supplemental bearing-surfaces—as, for instance, rails—(indicated by 9 and 10,) which rails will be higher than the track-rails 5 and 6, and the wheels 8 will engage with these supplemental rails and sustain the major portion of the weight of the truck. It is well known that in running on a curve the flanges of the wheels bind against the outer rail of the curve and the treads of the wheels slide laterally on the tops of the rails. This binding and sliding cause very great friction when there is much weight on the wheels, and the object of my invention is to relieve this friction. When the wheels 8 run onto the supplemental rails, the weight of the truck will be mainly supported thereby, and as these wheels are substantially midway the length of the truck the latter can turn on them as on a pivot. In running on a curve the flange of the front wheel will by its engagement with the outer rail of the curve constantly tend to move the front end of the truck laterally toward the inside of the curve, and as the weight of the truck will be almost entirely removed from the front and rear wheels there will be very little frictional resistance to this movement and the truck will turn on the supplemental wheels and adjust itself to run around the curve with a minimum of wheel friction.

The foregoing construction is specially designed for street-railways, and the guard-rails or elevated flanges usually provided at curves may be utilized for the supplemental wheels to run on.

Referring to Figs. 3 and 4, it will be seen that the wheels 11 on the supplemental axle 7 have a grooved periphery and that their diameters increase gradually in each direction from the middle of the tread. These wheels are also intended to be mounted loosely on the axle 7 to turn freely thereon and they must be wider than the wheels 4. Preferably these wheels 7 will be in engagement with the track-rails and aid in supporting the weight of the truck at all times, they being so arranged that when running on a substantially straight track they will engage the rails midway the width of their tread-surfaces or where their diameters are the least. As soon, however, as the truck enters a curve the point of engagement between these wheels and the rails will shift to one side of the median line of their peripheries where their diameters are greater, and this will result in throwing more of the weight of the truck on these wheels and correspondingly relieving that on the front and rear wheels on both sides of the truck, and the sharper the curve the greater will be the transference of the weight, and the effect in reducing the wheel friction will be the same as is accomplished by the structure shown in Figs. 1 and 2 and heretofore described, for the major portion of the weight of the truck will be sustained by these supplemental wheels on sharp curves and the truck will be able to turn pivotally on them. This construction is better adapted for steam railway-cars.

While I have illustrated and described two constructions by which my invention may be carried into effect, I do not intend to limit the embodiment of my invention to such constructions.

Having described my invention, I claim—

1. The combination with a car-truck and its front and rear flanged supporting-wheels, of supplemental wheels suitably mounted on the truck intermediate the front and rear supporting-wheels, each of said supplemental wheels having a peripheral bearing-surface to engage a rail only when the truck is moving over a curved track, and, when so engaged, to support the major portion of the weight of the truck on both sides thereof on a higher horizontal plane than it could be supported by the front and rear wheels, substantially as and for the purpose set forth.

2. The combination with a railway-car truck and its front and rear flanged supporting-wheels, of supplemental wheels suitably mounted on the truck intermediate the front and rear supporting-wheels and substantially midway the length of the truck, each of said supplemental wheels having a peripheral bearing-surface to engage a rail only when the truck is moving over a curved track, and, when so engaged, to relieve the front and rear supporting-wheels on both sides of the truck of the major portion of the weight sustained by them when running on a straight track, and to serve as a pivot on which the truck may turn, for the purpose set forth.

3. The combination with a railway-car truck, its front and rear axles and flanged supporting-wheels rigidly connected to said axles to turn therewith, of a supplemental axle connected to the truck intermediate the front and rear axles, wheels mounted on said supplemental axle to turn freely thereon, each wheel on the supplemental axle having a peripheral bearing-surface to engage a rail only when the truck is moving over a curved track, and, when so engaged, to relieve the front and rear supporting-wheels on both sides of the truck of the major portion of the weight sustained by them when running on a straight track, and to serve as a pivot on which the truck may turn, for the purpose set forth.

4. The combination with a railway-car truck and its front and rear flanged wheels adapted to run on the track-rails and support the weight of the truck when the track is straight, of a pair of supplemental wheels suitably mounted on the truck intermediate the front and rear wheels, and bearing-surfaces adjacent to the track-rails where the latter are curved, said surfaces being higher than the track-rails and being engaged by the supplemental wheels when the truck is running over the curve, whereby the major portion of the weight of the truck is transferred from the front and rear wheels to the supplemental wheels on each side of the truck, as and for the purpose specified.

5. The combination with a car-truck, its front and rear axles and flanged wheels rigidly connected to the axles to turn therewith, said wheels being adapted to support the truck when running on a straight track, of a supplemental axle connected to the truck intermediate the front and rear axles and substantially midway the length of the truck, a pair of wheels mounted on the supplemental axle to turn freely thereon, and bearing-surfaces adjacent to the track-rails where the latter are curved, said surfaces being higher than the track-rails and being engaged by the supplemental wheels when the truck is running over the curve, whereby the major portion of the weight of the truck is transferred from the front and rear wheels to the supplemental wheels on each side of the truck, as and for the purpose specified.

In testimony whereof I affix my signature in presence of two witnesses.

HERBERT KINTZ.

Witnesses:
WM. ANDERSON,
WM. RAPP.